(12) United States Patent
Kawaguchi

(10) Patent No.: US 6,176,735 B1
(45) Date of Patent: Jan. 23, 2001

(54) ACCOMMODATION BLOCK FOR AN ELECTRICAL CONNECTION BOX AND AN ELECTRICAL CONNECTION BOX COMPRISING THE BLOCK

(75) Inventor: Kiyofumi Kawaguchi, Yokkaichi (JP)

(73) Assignee: Sumitomo Wiring Systems, Ltd., Mie (JP)

( * ) Notice: Under 35 U.S.C. 154(b), the term of this patent shall be extended for 0 days.

(21) Appl. No.: 09/253,528

(22) Filed: Feb. 22, 1999

(30) Foreign Application Priority Data

Feb. 25, 1998 (JP) .................................................. 10-043932

(51) Int. Cl.7 ....................................................... H01R 13/60
(52) U.S. Cl. ............................ 439/532; 439/298; 439/467
(58) Field of Search .................................... 439/532, 533, 439/76.2, 296, 298, 299, 352, 467, 465

(56) References Cited

U.S. PATENT DOCUMENTS 4,412,724 * 11/1983 Morningstar et al. ................ 439/352
4,915,637 * 4/1990 Ogawa et al. ........................ 439/76.2
4,940,419 * 7/1990 Kurita et al. ......................... 439/76.2
5,219,242 * 6/1993 Liaw .................................... 439/467

FOREIGN PATENT DOCUMENTS 63-194053 U  12/1988  (JP) .

* cited by examiner

Primary Examiner—T. C. Patel
(74) Attorney, Agent, or Firm—Oliff & Berridge, PLC

(57) ABSTRACT

An accommodation block for connection of electrical components is mounted in an electrical connection box, e.g. of a vehicle. In the vicinity of each lengthwise end of side walls of the block body, there is formed an insertion guide extending downward from an upper end connected with the upper edge of the side wall. The guides are received in engagement elements of the box. The lower ends of the insertion guides are located below the lower end of the block body to improve visual observation during insertion into the box. A clamp is arranged below the block body. A protection rib for protecting the clamp is extended down from the lower end of one side wall.

7 Claims, 9 Drawing Sheets

ACCOMMODATION BLOCK FOR AN ELECTRICAL CONNECTION BOX AND AN ELECTRICAL CONNECTION BOX COMPRISING THE BLOCK

BACKGROUND OF THE INVENTION

1. Field of the Invention

The present invention relates to an accommodation block which accommodates electrical connectors for connection with electrical components such as wire harnesses, electrical and electronic circuits, electrical and electronic component parts and the like and which in use is mounted in an electrical connection box. The invention further relates to the electrical connection box, including the accommodation block mounted in it, and more particularly to an electrical connection box for a vehicle such as an automobile.

2. Description of the Related Art

Various electrical and electronic circuits, electrical and electronic component parts, and the like are installed inside a vehicle. An electrical connection box is used to accommodate these electrical and electronic component parts and as a connection branch point for wires such as wire harnesses.

Generally, in an electrical connection box, in order to facilitate assembly and safe storage, connectors of various electrical and electronic component parts and wire harnesses and the like are accommodated inside respective accommodation blocks, depending on kind or function. The accommodation blocks are themselves mounted in the electrical connection box at predetermined respective positions.

A conventional electrical connection box of this type will be described below with reference to FIGS. 10 and 11. This box is similar to that shown in Japanese Utility Model Unexamined Publication No. 63-194053. In this box and according to an embodiment of the present invention described later, the electrical connection box is described with a relay block as the accommodation block, but the same principle is applicable to other accommodation blocks.

As shown in FIGS. 10 and 11, a relay accommodation block 52 is accommodated inside a lower case 51 constituting an electrical connection box 50. The block 52 comprises a block body 53 formed in the shape of an approximately rectangular hollow body. A relay 55 is installed on each of four relay housings 54 formed in an upper portion of the block body 53.

In the vicinity of each lengthwise end of each side wall 56 of the block body 53, an insertion guide 57 is formed extending downward from its upper end portion which is connected with the upper edge of the side wall 56. Each insertion guide 57 has a shape approximately of an inverted "L" from a side view and rectangular from a front view. The lower end of each insertion guide 57 is level with the lower end of the block body 53. A gap C1 is formed between the back surface of each insertion guide 57 and the side wall 56. A reinforcing rib 58 connecting the insertion guide 57 and the side wall 56 with each other is formed vertically in the gap C1.

On each of the side walls 56, a pair of substantially V-shaped locking pieces 59 are formed adjacent insertion guides 57. Each of the locking pieces 59 comprises a base portion 59a fixed to the side wall 56 and a flexible portion 59b deformable toward the base portion 59a. A locking projection or nose 59c projecting toward the insertion guide 57 is formed in the vicinity of the upper end of the flexible portion 59b.

The lower case 51 is box-shaped and its upper part is open, thus having side walls 60a and 60b opposed to each other. Two engaging portions 61 are formed on the inner surface of each of the side walls 60a and 60b. Each engaging portion 61 is formed at a position corresponding to the position of each insertion guide 57 of the relay accommodation block 52. Recess portions 62 into which the insertion guides 57 can be inserted downwardly are formed in the engaging portions 61. A projecting nose 64 is formed on the upper end of a wall 63 of one engaging portion 61 and on the upper end of a wall 63 of the adjacent engaging portion 61. Each nose 64 is formed at a position corresponding to the position of the locking nose 59c of each locking piece 59 of the relay block 52.

An operator assembles the block 52 having the above-described construction inside the lower case 51. The operator inserts the block 52 into the lower case 51 downwardly by holding the relay housing 54 of the relays 55 or the side wall 56 of the relay block 52. At this time, the operator inserts each insertion guide 57 into the corresponding recess portion 62 of each engaging portion 61. This can be done with visual observation by the operator, thus locating the block 52 in position. As the operator inserts each insertion guide 57 further into the corresponding recess portion 62, the flexible portion 59b of each locking piece 59 is pressed by the nose 64 of each engaging portion 61 and thus deformed toward the base portion 59a. Then, simultaneously with contact between the lower surface 57a of the fixed upper end portion of each insertion guide 57 and the upper surface of the corresponding engaging portion 61, each of the deformed flexible portions 59b is released by the respective nose 64. Consequently, the locking nose 59c formed at the upper end of the flexible portion 59b engages under the nose 64. In this manner, the operator positions the relay block 52 in a locked position inside the lower case 51, thus completing the assembly operation.

However, during construction of the conventional block 52 and lower case 51, when the operator inserts each insertion guide 57 into the corresponding recess portion 62 of the engaging portion 61, the position of the operator's hands, which hold the relay block 52 and the block body 53, make it difficult for the operator to easily view all the insertion guides 57. Therefore, the operator has the task of inserting each of the insertion guides 57 into the corresponding recess portion 62 which becomes complicated. Thus, installing the relay block 52 to the lower case 51 is troublesome, and there is a risk of mis-fitting.

SUMMARY OF THE INVENTION

In view of the foregoing problems in the conventional structures, it is an object of the present invention to provide an accommodation block which can be easily installed on a box, and further to provide an electrical connection box accommodating this accommodation block.

According to the invention, there is provided an accommodation block for an electrical connection box, comprising a block body having opposite first and second side walls having lower edges; electrical connectors in the block body, for making electrical connection with electrical components; a plurality of insertion guide members which have upper ends fixedly connected to respective upper regions of the side walls of the block body and extend downwardly from the upper ends to lower ends thereof, which are located below the lower edges of said side walls.

The electrical connectors in the block body may be, for example, connectors of one or more wiring harnesses, or connectors which are fixed in the block. The electrical components which, in use, may be mounted in or on the block body may be electrical or electronic devices of any kind, relays being one example.

Preferably, the accommodation block of the invention has a clamp for holding at least one wire harness. The clamp is strip-shaped and has a first end connected hingedly with the first side wall of the block body and a second end remote from the first end. The block body has receiving means for receiving and holding the second end of said clamp, the receiving means being located adjacent to the second side wall of the block body. The block body further has a protection wall extending downwardly from the lower edge of the second side wall adjacent the receiving means so as to provide lateral protection of the clamp.

According to another aspect, the invention provides an electrical connection box comprising an accommodation block of the invention as described above, and a casing having opposite first and second side walls having on their respective opposed surfaces a plurality of engagement elements for respectively engaging the insertion guide members of the accommodation block. The accommodation box is mounted in casing with engagement of the insertion guides with the engagement elements.

BRIEF DESCRIPTION OF THE DRAWINGS

The exemplary embodiments of the invention will be described in detail, with reference to the following figures in which.

DETAILED DESCRIPTION OF PREFERRED EMBODIMENTS

Figure 10:
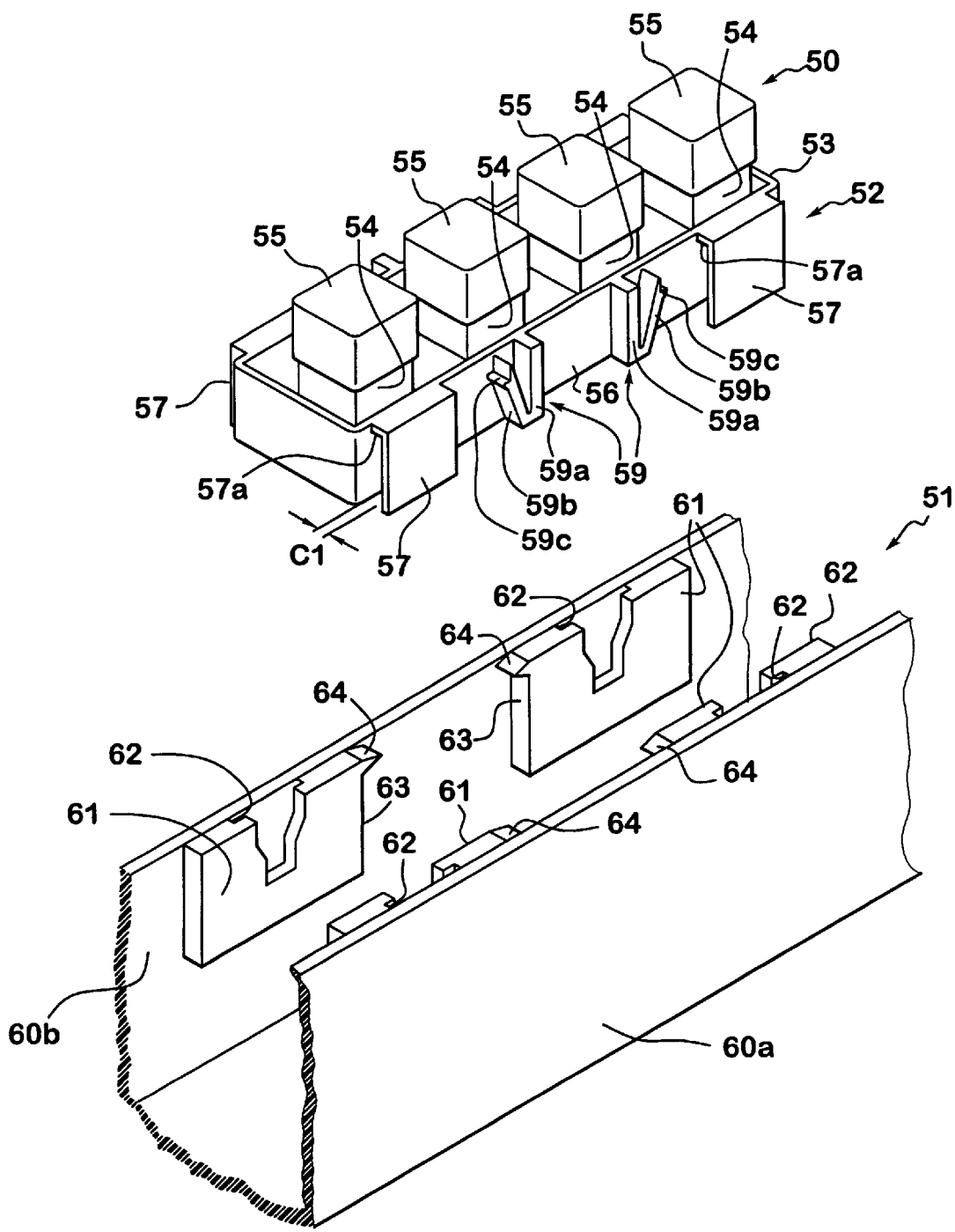
FIG. 10 is an exploded perspective view showing a conventional accommodation block and a conventional electrical connection box accommodating the accommodation block.
Figure 11:
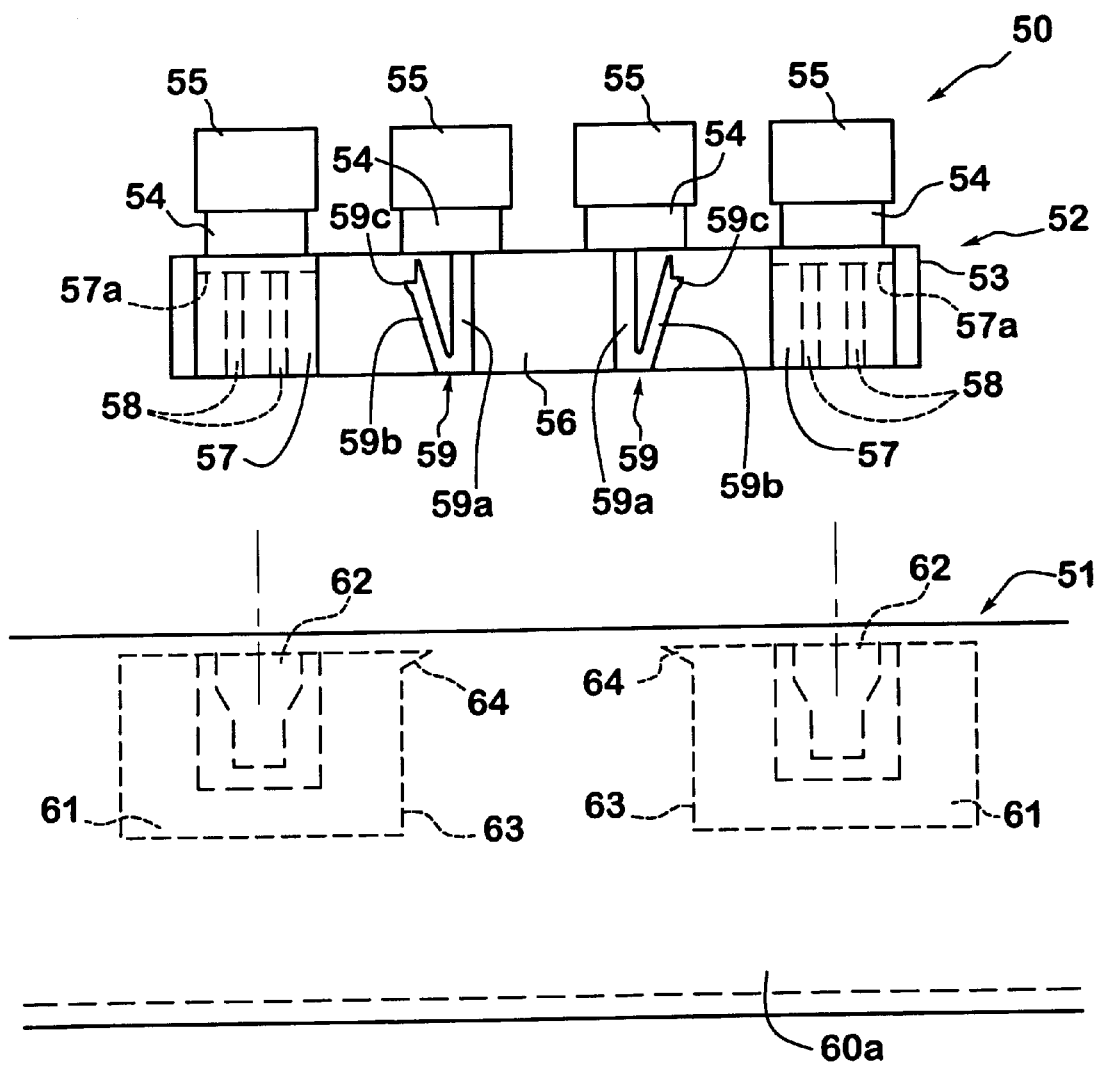
FIG. 11 is a front view showing the conventional accommodation block and electrical connection box of FIG. 10.

A first embodiment of the present invention will be described with reference to FIGS. 1 to 6. Parts corresponding to parts of the conventional electrical connection box shown in FIGS. 10 and 11 are denoted by the same reference numerals, and a detailed description of these parts is not repeated herein.

Figure 1:
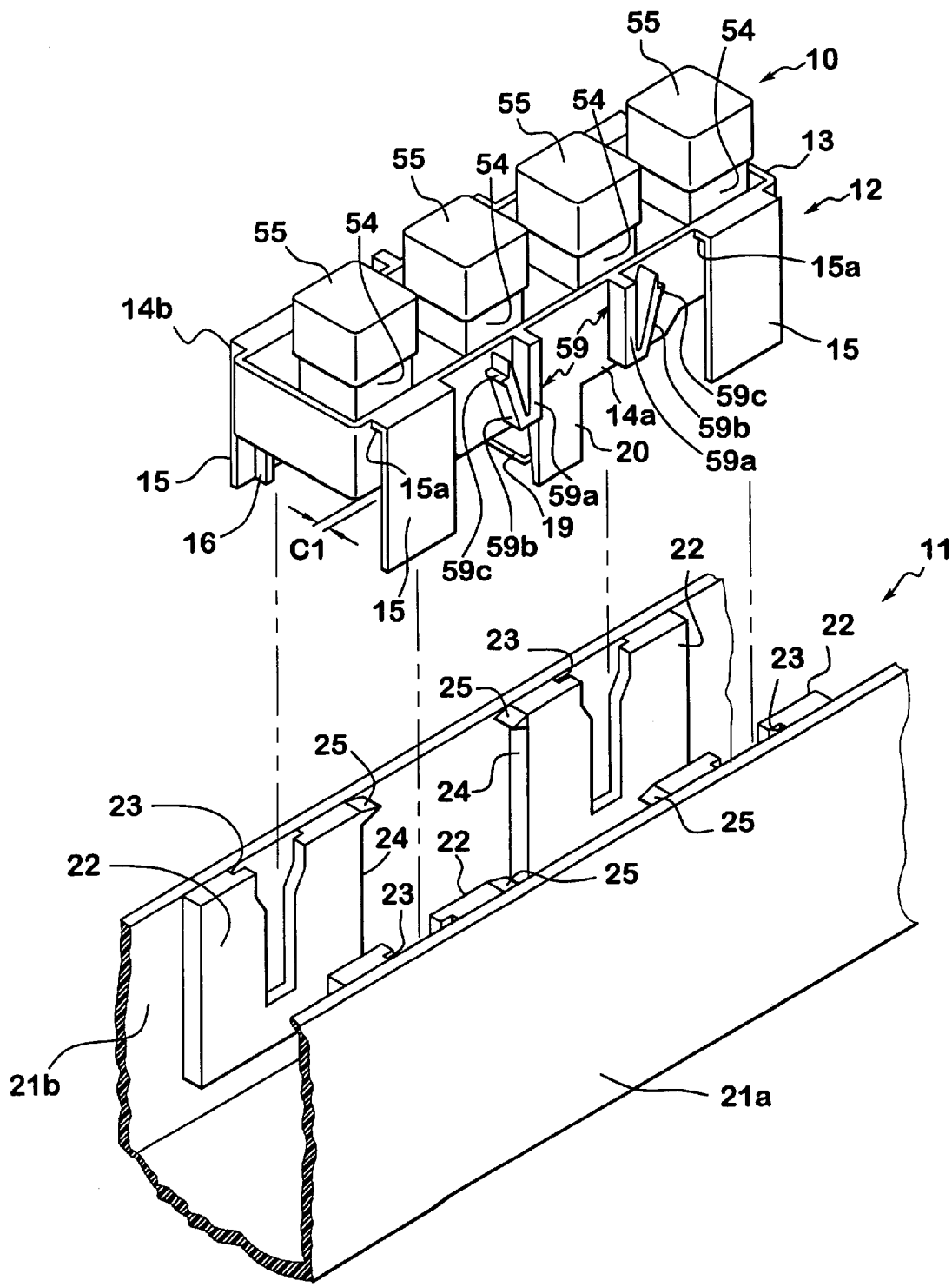
FIG. 1 is an exploded perspective view showing an accommodation block and an electrical connection box accommodating the accommodation block according to a first embodiment of the present invention.
Figure 2:
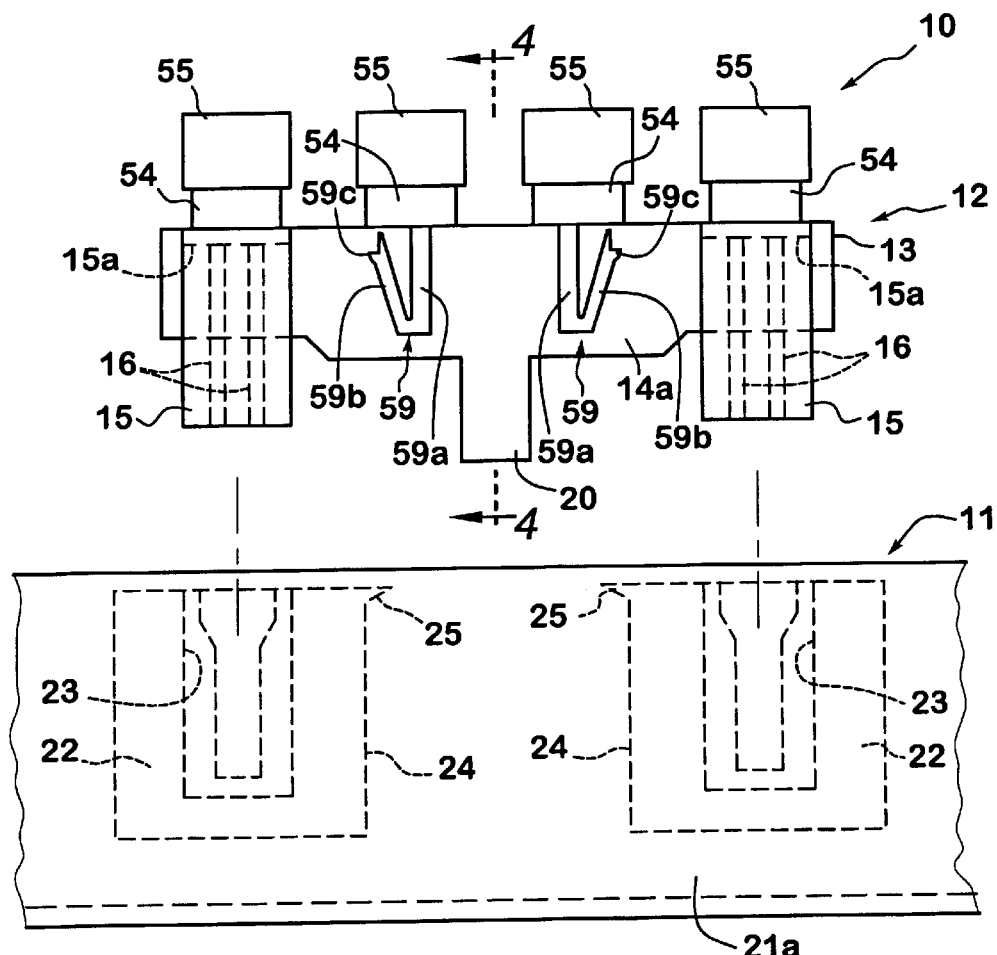
FIG. 2 is a front view showing the accommodation block and the electrical connection box of FIG. 1.

As shown in FIGS. 1 and 2, a relay accommodation block 12 is accommodated inside a lower case 11 constituting an electrical connection box 10. The block 12 comprises a block body 13 formed in the shape of an approximately rectangular hollow body. A relay 55 is installed on each of four relay housings 54 formed in the block body 13.

Figure 3:
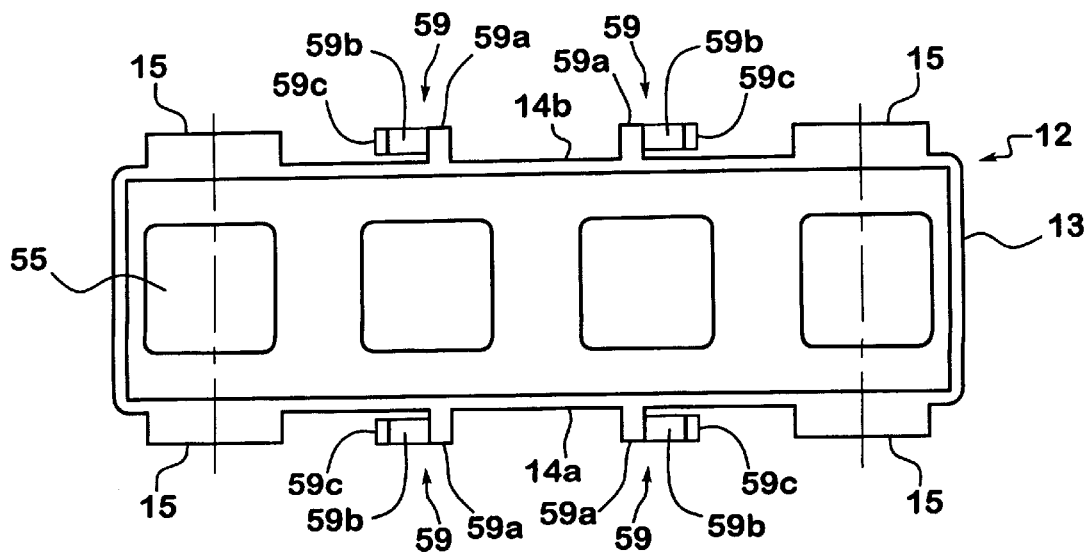
FIG. 3 is a plan view showing the accommodation block and the electrical connection box of FIG. 1.

In the vicinity of each lengthwise end of each of opposite side walls 14a, 14b of the block body 13, there is formed an insertion guide 15 extending downward from its upper end portion which is fixedly connected with the upper edge of the respective side wall 14a, 14b. That is, two insertion guides 15 are formed on each of the side walls 14a, 14b. As shown in FIG. 3, the insertion guides 15 formed on the respective side walls 14a,14b at one end of the body 13 are precisely opposite each other, and the same is true at the other end of the body 13. Each insertion guide 15 has a shape of an approximately inverted "L" in side view and is rectangular in front view. The lower end of the insertion guide 15 is below the lower end of the block body 13, by an amount which is at least 25% of the overall height of the side wall 14a, 14b covered by the insertion guide 15. A gap C1 is formed between the back surface of each insertion guide 15 and the respective side wall 14a, 14b. A reinforcing rib 16 connecting each of the insertion guides 15 and each of the side walls 14a, 14b with each other is formed vertically in the gap C1. In each guide 15, the reinforcing rib 16 extends to the lower end of the guide 15. The reinforcing rib 16 increases the strength of the insertion guide 15, thus reducing risk of it being damaged or deformed.

Figure 4:
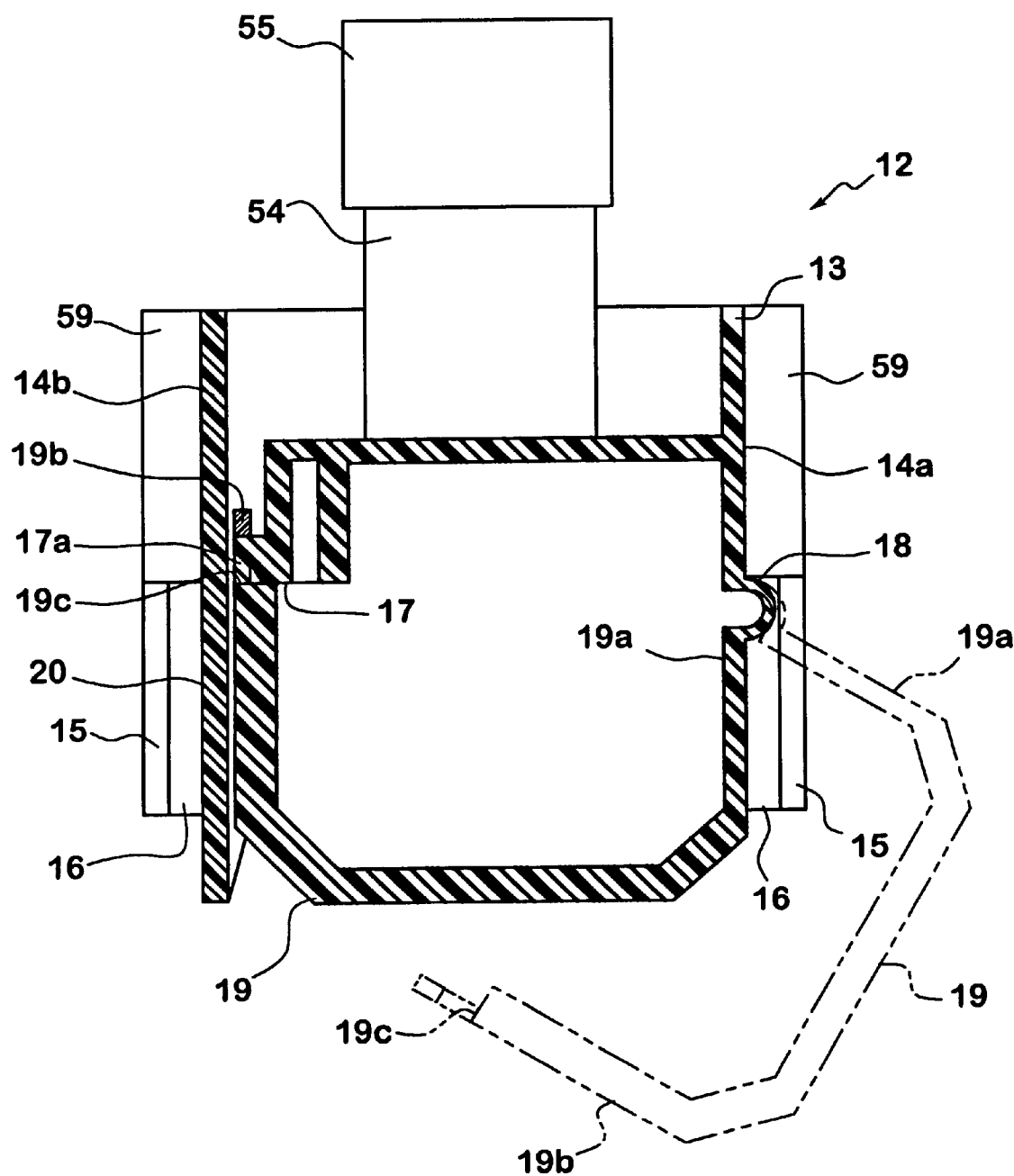
FIG. 4 is a sectional view taken along line A—A of FIG. 2.

As shown in FIG. 4, inside the block body 13 and in the vicinity of the side wall 14b, there is formed a clamp receiving means in the form of a latching portion 17 having a latching nose 17a thereon. A corresponding clamp 19 is arranged below the block body 13. The clamp 19 is strip-shaped and has a first end 19a connected with the lower edge of the side wall 14a of the block body 13 through a hinge 18 and a second free end 19b having a latching recess portion 19c in which latching nose 17a of the block body 13 fits. A protection plate or rib 20 extends from the lower end of the side wall 14b in the vicinity of the latching portion 17.

The clamp 19 holds wire harnesses (not shown in the drawing) electrically connected with terminals (not shown in the drawing) of the relays 55 by sandwiching them. Thus, it is possible to restrict the run direction of the wire harnesses to a predetermined direction and prevent them from twining with each other or prevent them from being installed alongside other kinds of wires. Further, when the free end 19b of the clamp 19 is fitted in the latching portion 17 of the block body 13, the clamp 19 is protected by the protection rib 20. Accordingly, when an external force is applied to the clamp 19 during storage of the relay block 12, the clamp is protected from being deformed or damaged.

As shown in FIGS. 1 and 2, the lower case 11 is box-shaped and its upper part is open, thus having side walls 21a and 21b opposed to each other. Two engaging portions 22 are formed on the inner surface of each of the side walls 21a and 21b. Each engaging portion 22 is formed at a position corresponding to the position of one of the four insertion guides 15 of the relay block 12. A recess portion 23 which guides the corresponding insertion guide 15 when inserted into it downwardly is provided in each engaging portion 22. A projection nose 25 is formed on the upper end of a wall 24 of one engaging portion 22 and on the upper end of the opposed wall 24 of the adjacent engaging portion 22. Each projection nose 25 is formed at a position corresponding to the position of a locking nose 59c formed at the upper end of each locking piece 59 of the block 12.

The relay accommodation block 12 having the above-described construction of FIGS. 1 to 6 is accommodated in the lower case 11 in a manner similar to that of the conventional construction. It is to be noted that according to this embodiment of the invention, the lower end of each of the insertion guides 15 is located below the lower end of the block body 13 by a predetermined amount. Thus, after each insertion guide 15 is inserted into the corresponding recess portion 23 by the predetermined length, the block 12 is accommodated in the lower case 11.

An operator inserts each insertion guide 15 into the corresponding recess portion 23 with visual observation, to locate the relay block 12 in position. At this time, the operator can easily see the insertion of the lower end of each of the insertion guides 15 into the recess portion 23 of the corresponding engaging portion 22.

Figure 5:
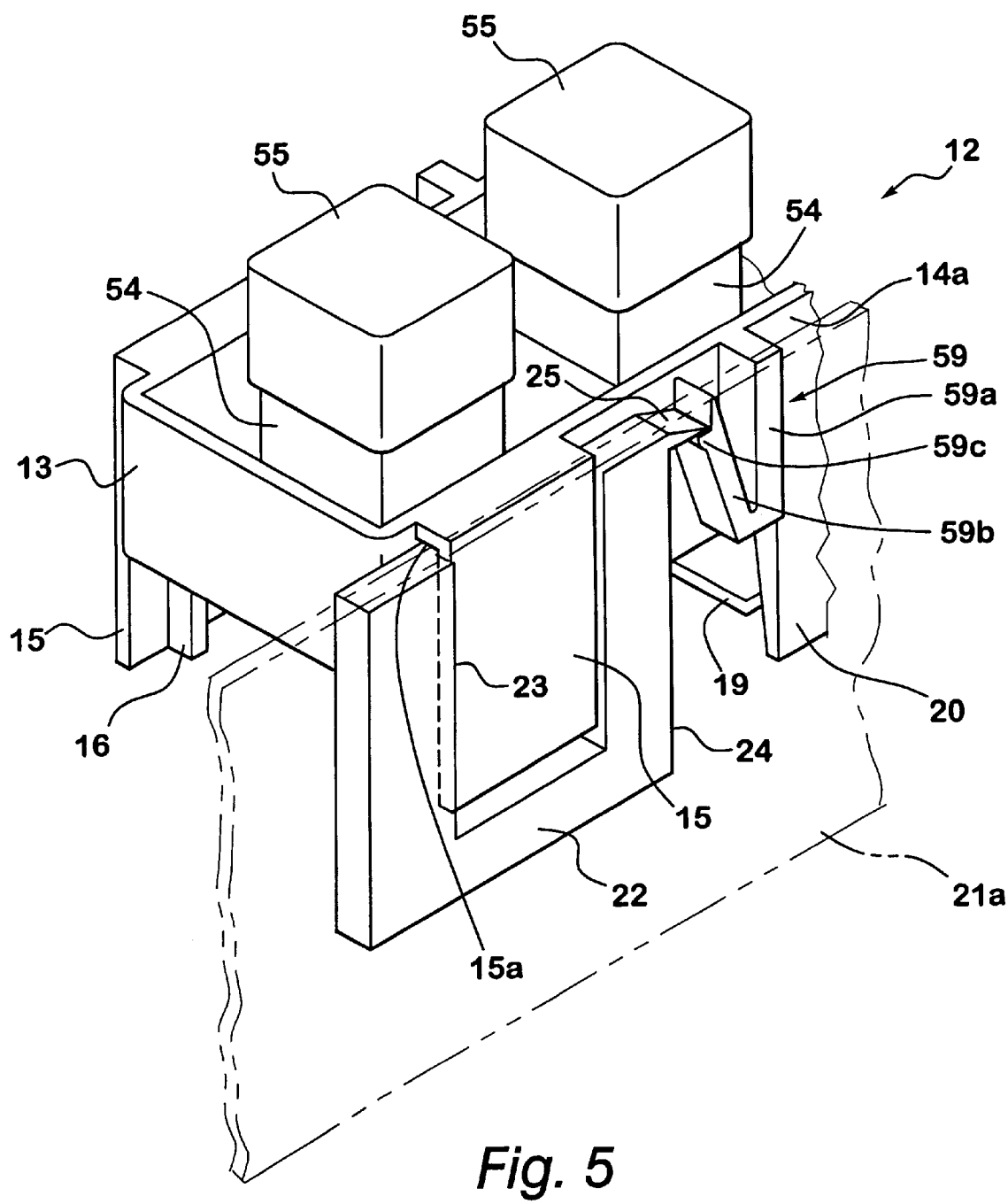
FIG. 5 is an enlarged view of a portion of the accommodation block and connection box according to the embodiment of FIG. 1.
Figure 6:
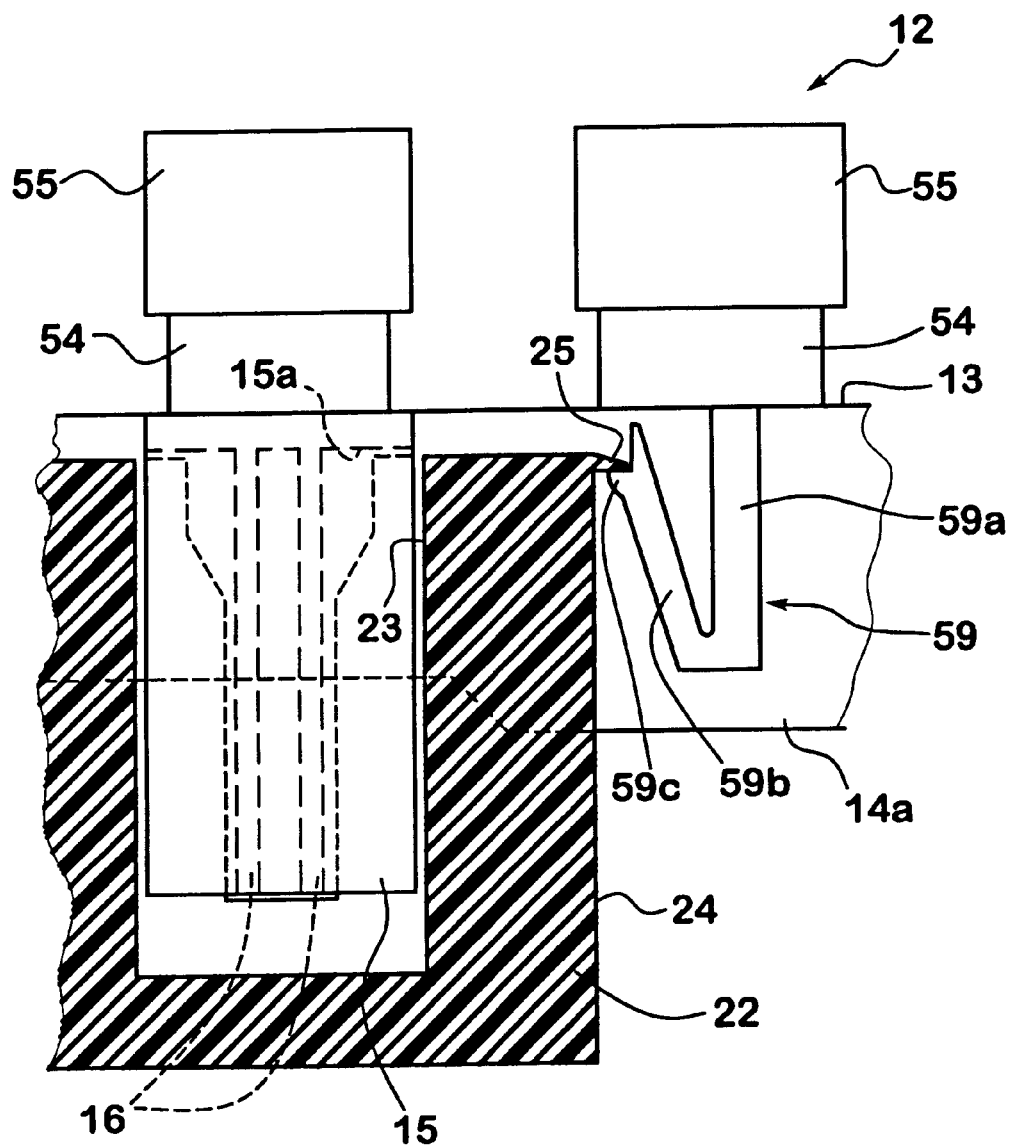
FIG. 6 is an enlarged sectional view of a portion of the accommodation block of the embodiment of FIG. 1.

Then, the operator fully inserts each insertion guide 15 into the corresponding recess portion 23 to accommodate the relay block 12 inside the lower case 11. As a result, the flexible portion 59b of each locking piece 59 is pressed by the projection nose 25 of the respective engaging portion 22 and deformed toward the base portion 59a. Then, simultaneously with the contact between the lower surface 15a of the fixed upper end portion of each of the insertion guides 15 and the upper surface of each of the engaging portions 22, each of the deformed flexible portions 59b is released by the corresponding projection nose 25. Consequently, as shown in FIGS. 5 and 6, the locking nose 59c of each of the flexible portions 59b engages the corresponding projection portion 25. Owing to the engagement between each locking nose 59c and the corresponding nose 25, the relay block 12 is locked in position inside the lower case 11. In this state, because the lower surface 15a of the fixed upper end portion of each insertion guide 15 contacts the upper surface of the engaging portion 22, the block 12 is prevented from moving further into the lower case 11.

Accordingly, the block 12 is prevented from vertical movement. Further, because each insertion guide 15 is inserted into the corresponding recess portion 23, the relay block 12 is prevented from being loose horizontally. In FIG. 6, two-dot chain lines show the line of sight through the insertion guide and broken lines show the line of sight through each engaging portion 22.

As described above in detail, the following effects can be obtained by this embodiment:

(1) The operator can view the insertion of each of the insertion guides 15 into the corresponding recess portion 23 at a glance when assembling the relay block 12 inside the lower case 11. Thus, the operator can easily place the relay block 12 in position inside the lower case 11. That is, the construction according to this embodiment improves reliability of installation of the relay block 12 on the lower case 11.

Further, it is possible to accommodate the relay block 12 inside the lower case 11 vertically and horizontally without looseness.

(2) The clamp 19 is capable of holding wire harnesses (not shown in the drawing) electrically connected with terminals (not shown in the drawing) of each of the relays 55 by sandwiching them. Thus, it is possible to restrict the extension direction of the wire harnesses to a predetermined direction and prevent them from twining with each other or prevent them from being installed alongside other kinds of wire. Further, the clamp 19 is protected by the protection rib 20. Accordingly, when an external force is applied to the clamp 19 during storage of the relay block 12, the clamping mechanism 17 can be prevented from being deformed or damaged.

(3) Because the reinforcing rib 16 is formed on each of the insertion guides 15, the insertion guides 15 can be suitably prevented from being damaged or deformed.

Modifications of this embodiment are possible. For example:

According to the present embodiment, the number of the insertion guides 15 and the corresponding engaging portions 22 is four, however, this number may be increased or decreased.

Figure 7:
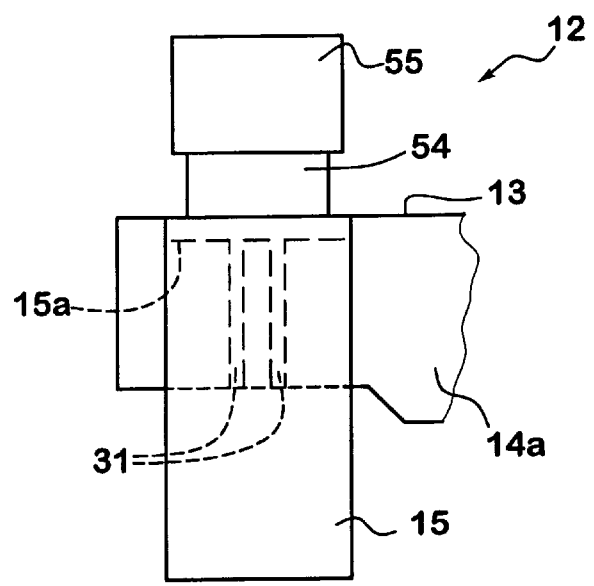
FIG. 7 is an enlarged view of a portion of an accommodation block according to a second embodiment of the invention.

In the embodiment, the reinforcing ribs 16 formed between the insertion guides 15 and the block body 13 extend to the lower end of the insertion guides 15. But as shown in FIG. 7, this reinforcing rib may be altered to form a reinforcing rib 31, which extends only to the lower end of the block body 13.

Figure 8:
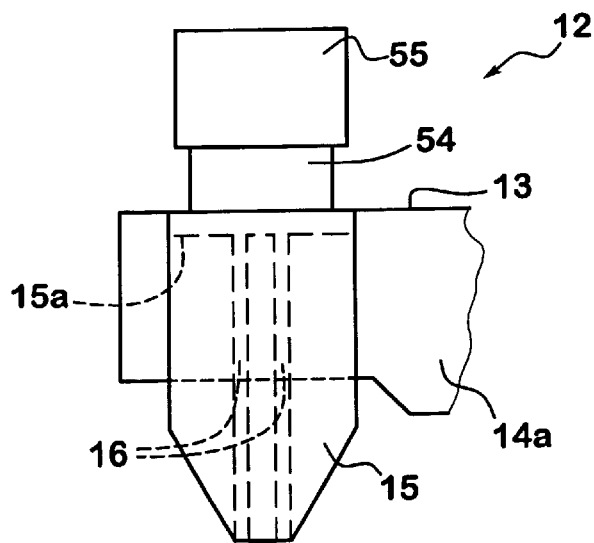
FIG. 8 is an enlarged view of a portion of an accommodation block according to another embodiment of the invention.

As shown in FIG. 8, the lower end of each insertion guide 15 may be tapered to facilitate the operation of inserting the insertion guide 15 into the corresponding recess portion 23.

Figure 9:
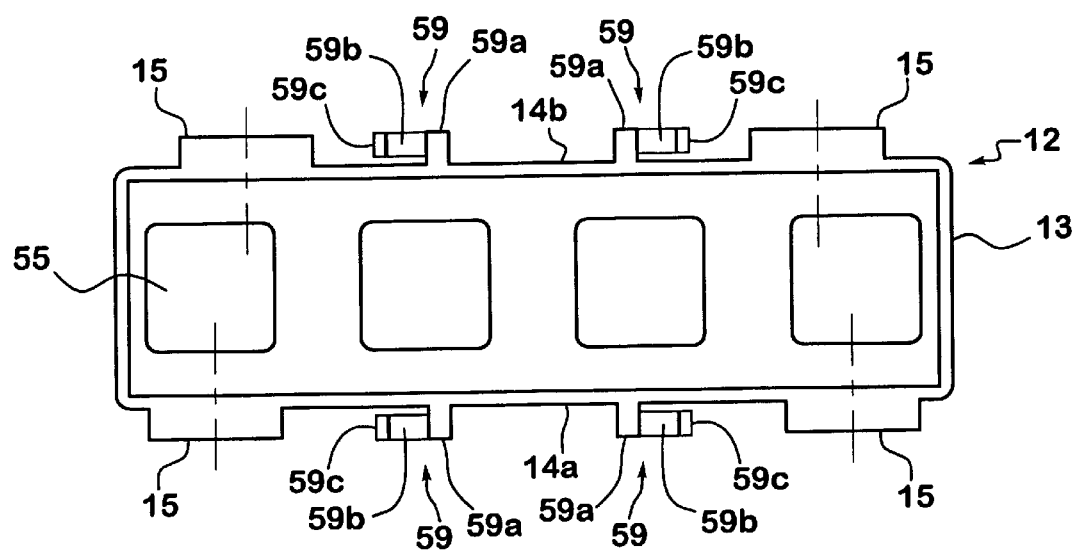
FIG. 9 is a plan view of an accommodation block according to another embodiment of the invention.

As shown in FIG. 3, the insertion guide 15 formed on the side wall 14a and that formed on the side wall 14b are opposed to each other. But as shown in FIG. 9, the insertion guide 15 formed on the side wall 14a and the insertion guide 15 formed on the side wall 14b may be shifted from each other in the length direction of the block body 13 to securely prevent the operator from inserting the block 12 in the lower case 11 with the front and back sides of the block 12 in the incorrect reversed position.

As shown in FIGS. 2 and 4, according to an embodiment of the invention, the lower end of the protection rib 20 is located below the lower ends of the insertion guides 15, however, the lower ends of the insertion guides 15 may be positioned at the same level as that of the protection rib 20 or below that of the protection rib 20.

While the invention has been described in conjunction with the preferred embodiments as described above, it is evident that many alternatives, modifications and variations are apparent to those skilled in the art. Accordingly, the preferred embodiments in the invention set forth above are intended to be illustrative and not limiting. Various changes may be made without departing from the spirit and scope of the invention.

What is claimed is:

1. An accommodation block for an electrical connection box for use with electrical components, comprising:

a block body having opposite first and second side walls, each of the first and second side walls having an upper portion and a lower edge;

electrical connectors disposed in the block body electrically connectable with the electrical components;

at least one insertion guide member, the at least one insertion guide member having an upper end fixedly connected to the upper portion of at least one of the first and second side walls, the at least one insertion guide member extending below the lower edge of the at least one of the first and second side walls and a clamp for holding at least one wire harness for connection to the accommodation block, the clamp being strip-shaped and having a first end connected hingedly with the first side wall of the block body and a second end remote from the first end, the block body having receiving means for receiving and holding the second end of said clamp, the receiving means being located adjacent to said second side wall of said block body, the block body further having a protection wall extending downwardly from said lower edge of said second side wall adjacent said receiving means so as to provide lateral protection of said clamp.

2. An electrical connection box comprising:

an accommodation block having a block body having opposite first and second side walls each of the first and second side walls having an upper portion and a lower edge;

electrical connectors mounted in the block body electrically connectable with the electrical components;

at least one insertion guide member, the at least one insertion guide member having an upper end fixedly connected to the upper portion of at least one of the first and second side walls, the at least one insertion guide member extending below the lower edge of the at least one of the first and second side walls;

a clamp for holding at least one wire harness for connection to the accommodation blocks, the clamp being strip-shaped and having a first end connected hingedly with the first side wall of the block body and a second end remote from the first end, the block body having receiving means for receiving and holding the second end of said clamp, the receiving means being located adjacent to said second side wall of said block body, the block body further having a protection wall extending downwardly from said lower edge of said second side wall adjacent said receiving means so as to provide lateral protection of said clamp, a casing having opposite first and second side walls, each of the first and second side walls having on their respective opposed surfaces at least one engagement element for respectively engaging the insertion guide members of the accommodation block, wherein the accommodation block is mounted in said casing with engagement of the insertion guides with the at least one engagement element.

3. The accommodation block according to claim 1, further comprising a reinforcing rib connecting the at least one insertion guide with one of the first or second side walls.

4. The accommodation block according to claim 1, further comprising at least one locking piece disposed on at least one of the first and second side walls, adjacent the at least one insertion guide members, the locking piece having a flexible portion and locking nose.

5. The accommodation block according to claim 1, wherein the at least one insertion guide is tapered.

6. The electrical connection box according to claim 2, further comprising at least one locking piece disposed on at least one of the first and second side walls, adjacent the at least one insertion guide members, the locking piece having a flexible portion and locking nose.

7. The electrical connection box according to claim 6, wherein the flexible portion of the locking piece engages the at least one engagement member.

* * * * *